United States Patent [19]
Kahler et al.

[11] 3,874,620
[45] Apr. 1, 1975

[54] REVERSING APPARATUS FOR A JET ENGINE

[75] Inventors: Charles Kahler, Kirkland; Lucas James Kimes, Seattle, both of Wash.

[73] Assignee: The Boeing Company, Seattle, Wash.

[22] Filed: Mar. 9, 1973

[21] Appl. No.: 339,725

[52] U.S. Cl............ 244/110 B, 244/12 D, 244/23 D
[51] Int. Cl............................................. B64c 15/04
[58] Field of Search...... 244/53 R, 52, 110 B, 12 D, 244/23 D; 60/228–230; 239/265.19, 265.29

[56] References Cited
UNITED STATES PATENTS

| | | | |
|---|---|---|---|
| 2,943,443 | 7/1960 | Voymas et al.......................... | 60/230 |
| 2,991,961 | 7/1961 | Rogallo et al.......................... | 244/15 |
| 3,024,601 | 3/1962 | Nash...................................... | 60/229 |
| 3,126,171 | 3/1964 | Stepniewski et al. ............. | 244/12 D |
| 3,280,561 | 10/1966 | Kutney................................. | 60/226 A |
| 3,570,767 | 3/1971 | Lawson et al................... | 239/265.29 |
| 3,604,662 | 9/1971 | Nelson, Jr. et al.............. | 244/110 B |

FOREIGN PATENTS OR APPLICATIONS

| | | |
|---|---|---|
| 1,253,071 | 11/1971 | United Kingdom |
| 1,210,939 | 10/1970 | United Kingdom |

Primary Examiner—Trygve M. Blix
Assistant Examiner—Sherman D. Basinger
Attorney, Agent, or Firm—Christensen, O'Connor, Garrison & Havelka

[57] ABSTRACT

A STOL aircraft employs upper surface blowing by mounting jet engines forwardly and above the wings so that the exhaust nozzles of the engines normally open onto the upper airfoil surfaces of the wings. An engine exhaust nozzle is formed by a portion of the upper airfoil surface adjacent to the leading edge of the wing, spaced connecting members extending upwardly from the airfoil, and a channel-shaped panel movably mounted on the connecting members. The panel is movable from a cruise position in which the nozzle directs the engine exhaust stream rearwardly with respect to the longitudinal axis of the engine and a reversing position in which the nozzle directs the exhaust stream upwardly and forwardly with respect to the longitudinal axis of the engine. The movable panel includes a lip door which is nested within the forward portion of the panel during cruise, but which moves forwardly when the panel is in a reversing position to assist in turning the exhaust stream forwardly and to direct the stream outboard with respect to the aircraft. A single powered actuator moves the panel and the lip door from the cruise position to the reversing position.

7 Claims, 12 Drawing Figures

Fig. 1.

PATENTED APR 1 1975

REVERSING APPARATUS FOR A JET ENGINE

BACKGROUND OF THE INVENTION

This invention relates to thrust reversing apparatus for jet-powered aircraft and more particularly to thrust reversing apparatus for a jet engine mounted on an airfoil so as to utilize the principle of upper surface blowing.

Upper surface blowing is the descriptive term used when an exhaust gas stream from a turbofan engine, or other propulsion engine which provides a relatively high mass flow, is directed over the upper airfoil surface of a wing. In conjunction with properly designed trailing edge flaps, so directing the exhaust stream will cause it to adhere to the upper surfaces of the flaps when extended and thereby to be turned downwardly by the Coanda effect. By so directing and turning the exhaust stream, lift is increased in two ways. First, supercirculation of the air stream past the airfoil supplements conventional aerodynamic lift. Supplemented lift through supercirculation is attained through distortion of the ambient air stream as it flows across the airfoil. This distortion is increased resulting in greater lift when the flaps are extended and the exhaust stream is diverted downwardly thereover. Secondly, aerodynamic lift is directly augmented since the thrust vector direction is rotated upwardly from its conventional direction, which is generally parallel to the longitudinal axis of the aircraft, as the exhaust stream is turned downwardly.

Thrust reversing mechanisms of the prior art are not readily adaptable to engines mounted to take advantage of upper surface blowing. Reversing mechanisms of the prior art also require many moving parts, including tracks, rollers, translating sleeves, four bar linkages and other types of articulating linkages. In addition such prior art reversing mechanisms have not solved the problems of providing high reverser efficiency, matching of engine exhaust flow in the cruise and reversing positions, hot gas impingement on the airplane, and the stirring up of debris on the ground by downwardly deflected reversing thrust.

A broad object of the present invention is to provide thrust reversing apparatus for an aircraft utilizing upper surface blowing. Further objects are to provide: a reversing mechanism which matches engine exhaust flow in the cruise position and the reversing position; a reversing mechanism which maintains substantially constant exhaust flow when the reversing mechanism is moving between the cruise position and the reversing position; a reversing mechanism which avoids reingestion of exhaust gases into the engine intake; a reversing mechanism which prevents impingement of exhaust gases on the airplane; a reversing mechanism which eliminates the dust, dirt and debris stirred up by a conventionally reversed exhaust stream, thus enabling its utilization on unimproved fields without causing ingestion of ground debris by the engine; a thrust reversing mechanism which can effectively by used down to zero vehicle speed and which can be utilized to back or sharply turn the airplane on the ground; and to provide the foregoing advantages and objects in a simple, compact, efficient reverser design.

SUMMARY OF THE INVENTION

The present invention therefore provides in an aircraft, the combination comprising a generally horizontal main wing of airfoil configuration having a leading edge and an upper airfoil surface, a jet propulsion engine mounted on the aircraft generally forward of and at a level above the wing in such relative position to direct its discharge exhaust stream aft across said upper airfoil surface, thrust reversing nozzle means for the engine comprising a stationary generally horizontal bottom wall extending aft from the engine and merging into the upper airfoil surface aft of the leading edge, means forming laterally spaced, upright, opposite side walls extending aft from the engine and contiguous to said bottom wall, means forming a nozzle top wall extending aft from the engine and supported by the side walls in such relationship with the bottom wall as to direct the exhaust stream aft directly across said upper airfoil surface, said side walls being segmented into lower portions stationary in relation to the wing and separate upper portions, the upper portions and said top wall forming a movable thrust reverser panel of inverted channel configuration, means mounting the panel on the wing to pivot in a fore-and-aft upright plane about a transverse axis, the aft edge of the panel being so configured and the pivot axis being so located as to permit retractive swinging of the reverser panel aft and upwardly into a forwardly inclined position across the exhaust stream with its aft edge substantially abutted to the bottom wall, thereby to open a reverse thrust discharge port at the top adjacent the aft end of the engine and direct the jet generally upwardly and forwardly through the port, and means to actuate the panel to effect such retractive swinging thereof.

BRIEF DESCRIPTION OF THE DRAWINGS

A better understanding of the present invention can be aquired by reading the ensuing specification in conjunction with the accompanying drawings wherein.

DESCRIPTION OF THE PREFERRED EMBODIMENT

Figure 1:
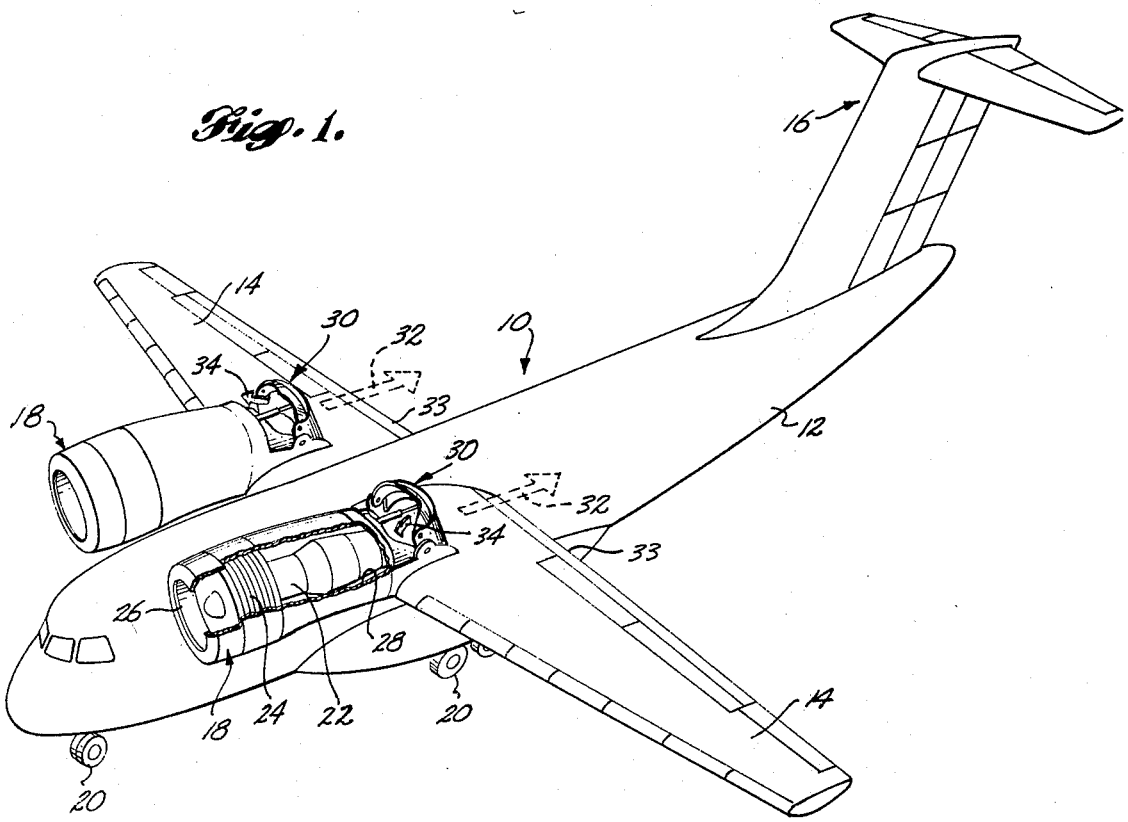
FIG. 1 is an isometric view of a high wing aircraft (with parts broken away for purposes of illustration) having engines located to take advantage of upper surface blowing and including thrust reversing apparatus shown in the reversing position.

An aircraft on which the reversing apparatus of the present invention can be employed is shown in FIG. 1. The aircraft 10 includes a fuselage 12, left and right wings 14, and horizontal and vertical stablizers 16. The left and right wings 14 are mounted high on the fuselage 12 to provide good ground clearance and also facilitate service and loading of the aircraft 10. The aircraft 10 is supported on the ground by suitable landing gear 20.

The aircraft shown in designed for short take off and landing (STOL) capability. Twin jet propulsion engines 18, preferably of the turbofan type capable of producing a high mass flow exhaust at subsonic speeds, are cantilevered by structural members (not shown) above and substantially forwardly of the leading edges of the wings 14. The engines 18 are positioned so that during cruise, take off and landing their exhaust streams are directed chordwise over the upper airfoil surfaces of the wings 14, as indicated by dashed arrows 32. As will be described later, the lower walls of the engine nozzles 30 starting near the leading edges of the wings merge with and lie in conformity along the upper airfoil surfaces. When the trailing edge flaps 33 aft of the engines 18 are extended, the effects of upper surface blowing, described above, can be utilized to supplement aerodynamic lift through supercirculation and to augment overall lift by thrust vectoring.

In the preferred embodiment of the invention engines 18 of the turbofan type are employed. A turbofan engine is of the variety having a gas turbine 22 which drives a low pressure fan 24 which in turn takes low pressure air from the intake 26 and passes it through an annular channel formed between nacelle 28 and the turbine 22. The turbofan engines 18 used with the present invention are preferably of the mixed-flow type wherein the turbine exhaust and the fan air are combined in the exhaust nozzles 30. It is to be understood that the exhaust nozzles 30 and reversing apparatus of the present invention can be employed with propulsion engines other than the particlular type disclosed, such as a pure turbojet engine or a ducted fan driven by a prime mover separated from the fan.

The reversing apparatus forming part of the exhaust nozzles 30 are shown in FIG. 1 in the thrust reversing position. In this position egress of the exhaust stream chordwise across the upper airfoil surfaces is blocked and the exhaust streams are turned in a direction upwardly, forwardly and outboard with respect to the longitudinal axis of the aircraft, as indicated by arrows 34. By so diverting the exhaust streams the thrust vectors are directed at angles toward the longitudinal axis of the aircraft 10 and downwardly and rearwardly with respect to the longitudinal axis of the aircraft 10. In this manner a downward force is exerted on the aircraft thereby increasing the effectiveness of the landing gear braking action by increasing wheel-to-ground friction.

Since the exhaust stream is directed upwardly and forwardly, dirt and debris from the landing field is not disturbed, thereby decreasing the probability of injesting foreign objects into the engines. In addition the reversed thrust can be used to back and turn the aircraft without fear of ingesting foreign objects into the engines. Directing the reversed exhaust stream outwardly and upwardly also decreases the possibility that exhaust gases will be ingested into the engines.

Figure 2:
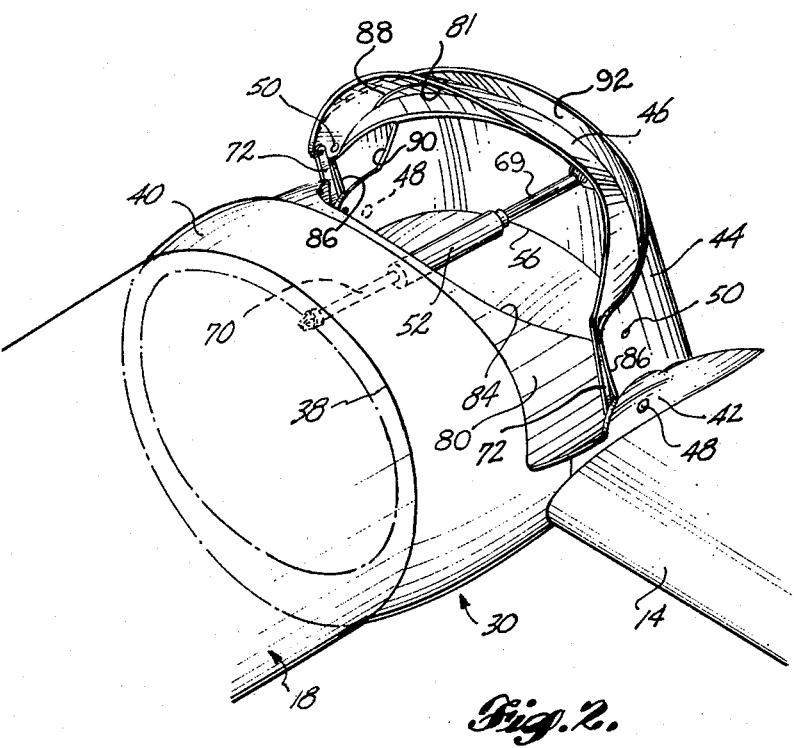
FIG. 2 is an enlarged isometric view showing the rear portion of an engine, the engine nozzle, and the thrust reversing apparatus of the present invention illustrated in the reversing position.

FIG. 2 is an enlarged isometric view showing the rearward portion of the left engine 18 and its cooperating nozzle 30. The turbofan engine 18, only partially shown in this view, is detachably connected to the nozzle 30 at joint 38 by conventional connectors (not shown). Thus engine servicing is simplified in that the nozzle 30 may remain with the aircraft while engine 18 is completely removed for servicing or replacement.

Figure 3:
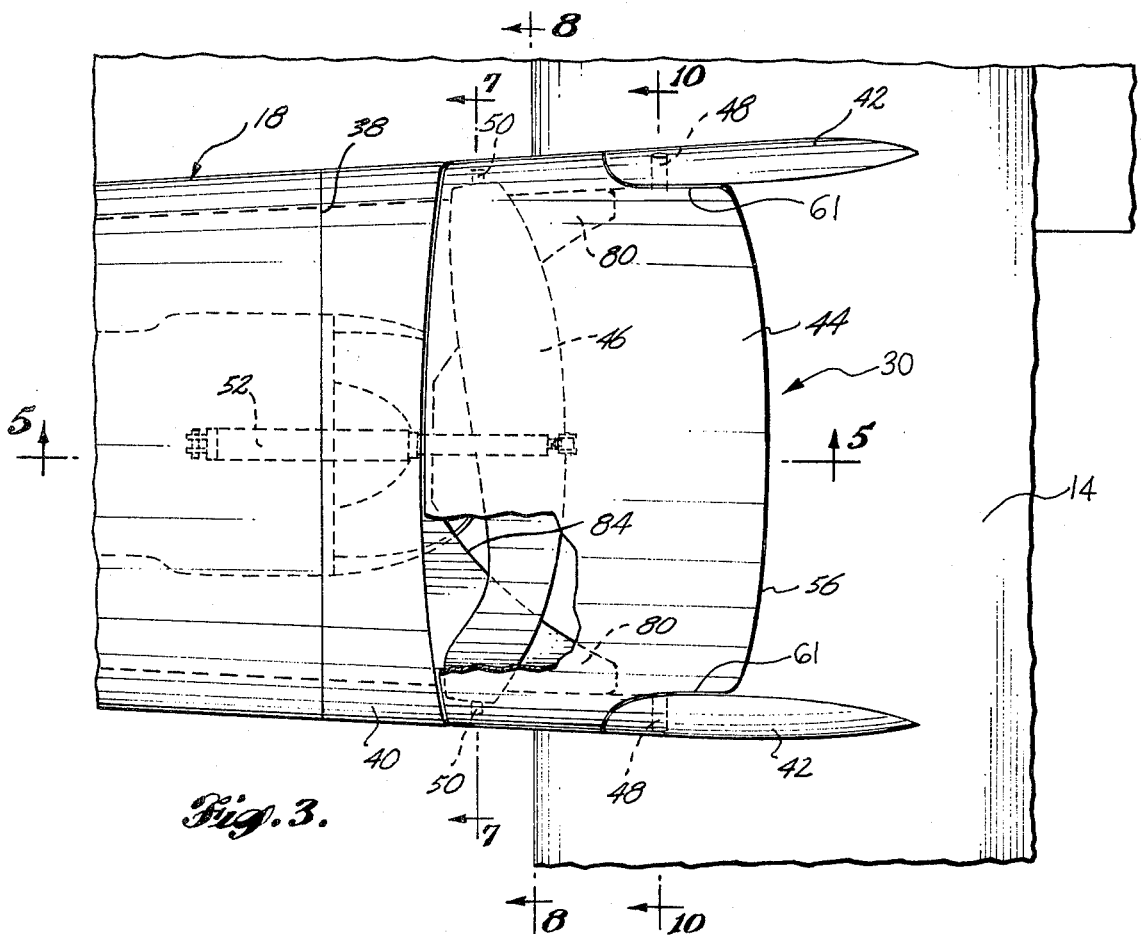
FIG. 3 is a plan view of the rear portion of an engine, the engine nozzle, and the reversing apparatus shown in the cruise position.

The forward portion 40 of the nozzle 30 is generally oblately rounded as it extends rearwardly from the joint 38. The nozzle 30 is connected to structural members (not shown) in the wing 14. The portion of the nozzle 30 extending rearwardly through the forward portion 40 from the joint 38 undergoes a configuration change to a more nearly rectangular shape as depicted in the cross-sectional views of FIGS. 7 and 8. A pair of spaced connecting members 42 (only one of which can be seen in FIG. 2) extend rearwardly from each side of the forward portion 40. As shown in FIG. 3, the connecting members 42 are arranged symmetrically about the longitudinal axis of the engine 18 and nozzle 30. The inner walls of connecting members 42 define a portion of the interior sides of the nozzle 30.

As will be described in more detail later, the nozzle 30 includes a main thrust reversing door 44, pivotally mounted by pins 48 on connecting members 42 about a transverse horizontal axis with respect to the longitudinal axis of the engine 18 and nozzle 30. In the thrust reversing position as shown in FIG. 2, the main door 44 is pivoted rearwardly and downwardly about the pins 48 to a position wherein the rearward edge 56 of the main door 44 contacts the upper surface of the wing 14 rearwardly adjacent of the nozzle 30. In this position the interior surfaces of the main door 44 block the normal rearward egress of exhaust from the nozzle 30 and deflect it upwardly and forwardly with respect to the longitudinal axis of the nozzle 30 and engine 18.

A lip door 46 is pivotally mounted on the main door 44 adjacent its lower forward edge by pins 50. In the reversing position shown in FIG. 2, the lip door 46 pivots forwardly from a nested location in the main door 44 (to be described in more detail later) to a position wherein it further deflects the exhaust stream, initially deflected by main door 44, forwardly at a lesser angle with respect to the longitudinal axis of the engine 18 and the nozzle 30. The exhaust stream then exits from the nozzle 30 through the reversing opening formed by the forward edge 81 of the lip door 46, the rearward edge 84 of a fairing 80 extending rearwardly from the forward portion 40 of the nozzle 30, and the forward bottom corner edges 86 of the main door 44.

As will be described in detail below, a single actuator 52 has a piston rod 69 which extends axially to pivotally move the main door 44 from a cruise position to the reversing position shown. A pair of links 72 pivotally move the lip door 46 to the reversing position from its nested location in which it resides when the doors 44 and 46 are in the cruise position.

Figure 4:
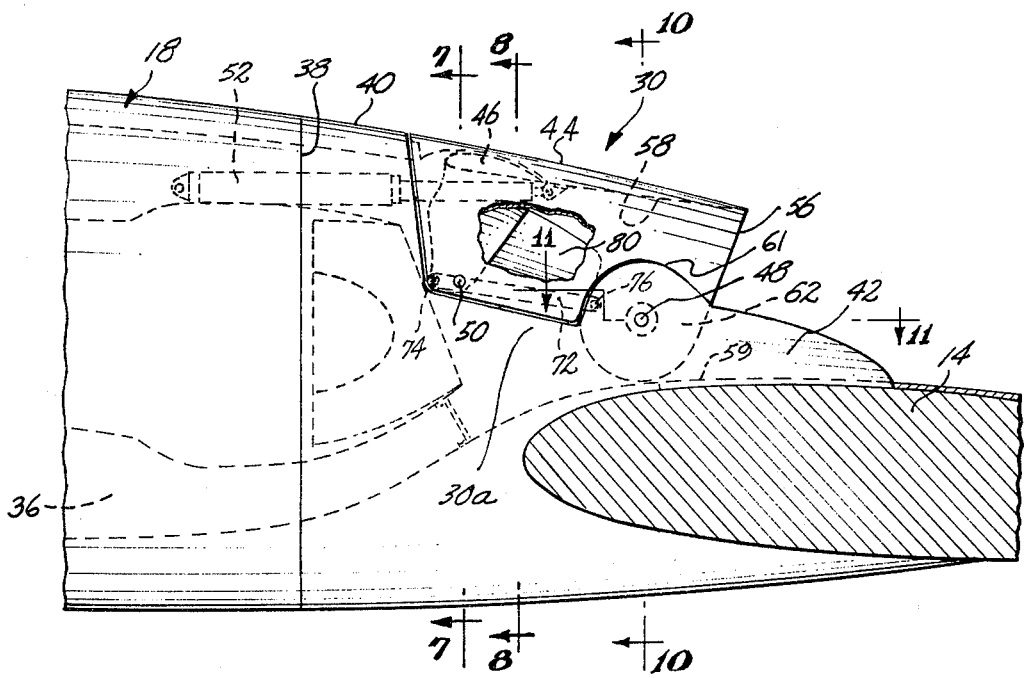
FIG. 4 is an elevation view in partial section of the structure shown in FIG. 3.
Figure 5:
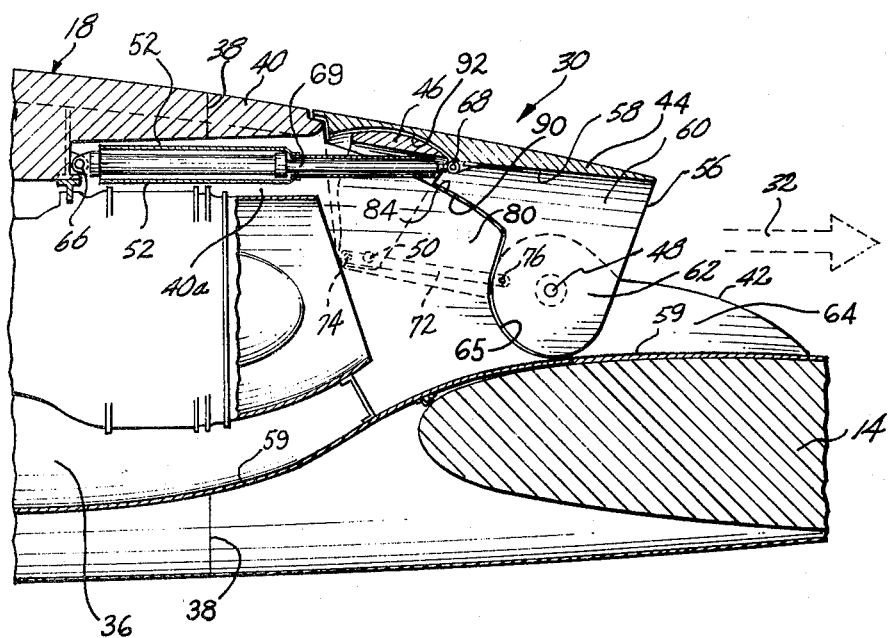
FIG. 5 is a longitudinal sectional view taken substantially along section line 5—5 of FIG. 3.

FIGS. 3, 4 and 5, detailed plan, elevation and longitudinal sectional views of the nozzle 30 and rear portion of the engine 18, shown the reversing doors 44 and 46 in a cruise position. The cruise position is that position in which the reversing doors 44 and 46 in cooperation with the remaining portions of the nozzle 30 direct the engine exhaust stream rearwardly chordwise across the upper airfoil surface of the wing 14. In the cruise position the exterior surfaces of the main door 44 form a streamlined continuation rearwardly from the exterior surfaces of the forward portion 40 of the nozzle 30. The main door 44 terminates in a rearward edge 56 to form the upper portion of the rearward opening of the exhaust nozzle 30.

The connecting members 42 extend rearwardly from the forward portion 40 of the nozzle 30 past the rear edge 56 of the main door 44 and terminate rearwardly thereof on the upper airfoil surface of wing 14. As better seen in the cross-sectional views of FIGS. 10 and 11, the interior and exterior sides of the connecting members 42 intersect downwardly into the wing 14 and are connected to structural members (not shown) in the wing 14. The exterior sides of the connecting members 42 extend upwardly beyond the pivot pins 48 and are faired to form a substantially smooth exterior surface transition from the connecting member 42 to the exterior surface of the door 44 interrupted only by the gap 61 between the connecting members 42 and the main door 44.

As seen in FIGS. 5, 7, 8 and 10 interior surface panel 59 extends rearwardly from the fan passage 36, and smoothly merges with the upper surface of the wing 14 to form the bottom wall of the nozzle 30. At the joint 38 (FIG. 5) panel 59 conforms to the shape of the interior of the fan passage 36 of the engine 18. As the panel 59 extends rearwardly from the joint 38, its configuration becomes less arcuate and gradually flattens out to merge into the upper surface of wing 14.

Figure 10:
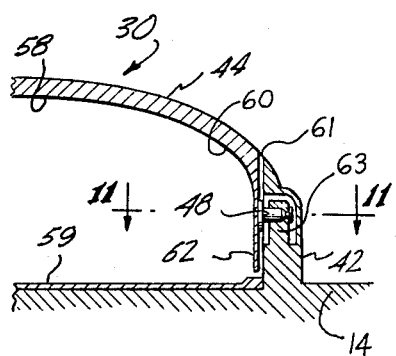
FIG. 10 is a cross-sectional view of the right side of the nozzle and reversing apparatus taken substantially along section line 10—10 of FIG. 4.

As best seen in FIGS. 5 and 10, the interior surface 58 of the upper portion of the main door 44 forms the upper and rearward interior wall of the nozzle 30. The door 44 has an inverted-channel-like configuration with the sides 60 extending downwardly from the interior surface 58 of the central upper portion of the door 44. In the region of the pivot pins 48 the sides 60 extend downwardly in the form of extensions 62 to a location adjacent the bottom interior surface panel 59. The nozzle opening in the cruise configuration thus is formed by the rear edge 56 of the main door 44, the upwardly exposed edges of the connecting members 42, and the bottom surface panel 59.

Figure 11:
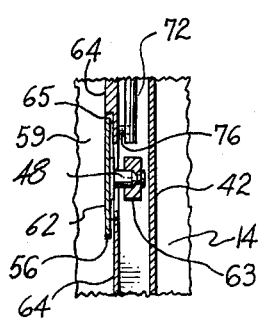
FIG. 11 is a sectional view taken substantially along the section line 11—11 of FIGS. 4 and 10.

Referring to FIGS. 4 and 5 and the sectional views of FIGS. 10 and 11, the interior surfaces of downward extensions 62 on the sides 60 of the main door 44 are coplanar with the inner surfaces 64 of the connecting members 42 forward of extensions 62. The downward extensions 62 are connected to the pivot pins 48 which in turn are connected to bearing blocks 63, mounted on each of the connecting members 42. As can be seen in FIG. 11, the inner wall 64 of the connecting member 42 forward of the downward extension 62 of the main door 44 contains a shoulder 65 behind which the extensions 62 recess. The outer surface of this shoulder 65 follows the contour of the forward lower portion of the downward extensions 62 and tapers outwardly under the extensions 62 to join with the inner wall 64 of the connecting members 42 rearwardly of the downward extensions 62. Thus as the main door 44 pivots about pins 48, the rear portion of main door 44 including the rear edge 56 is free to move inside the inner surface 64 of the connecting member 42 so that it can abut against the panel 59 to block rearward egress of exhaust from the nozzle 30.

Figure 7:
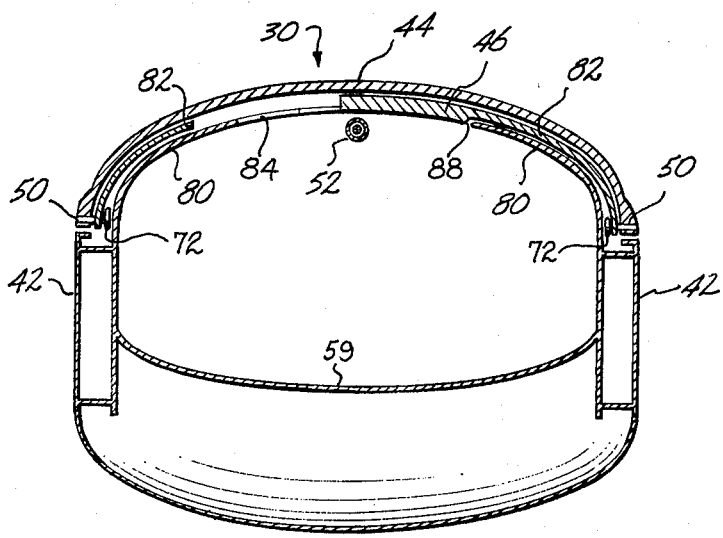
FIG. 7 is a cross-sectional view of the nozzle and the reversing apparatus taken substantially along section line 7—7 of FIG. 4 and omitting the engine turbine for clarity.
Figure 8:
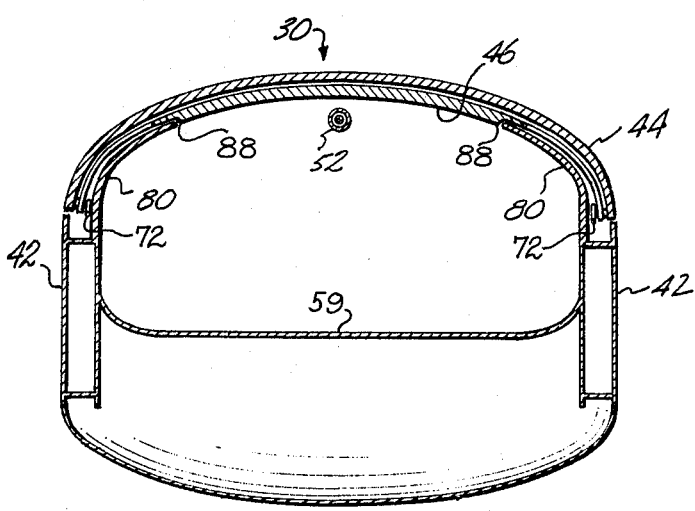
FIG. 8 is a cross-sectional view of the nozzle and the reversing apparatus taken substantially along section line 8—8 of FIG. 4 and omitting the engine turbine for clarity.

As can best be seen by reference to FIGS. 2 through 5, the forward and bottom portions of the main door 44 in the cruise position fit over the fairing 80 extending rearwardly from the forward portion 40 of the nozzle 30. Referring to the cross-sectional view of FIG. 7 in conjunction with the foregoing views, the downwardly extending sides of the lip door 46 are positioned between the outer surface of the fairing 80 and a recess 92 on the inner surface of the main door 44. A shoulder 88 which can be seen in FIG. 2 and the cross-sectional views of FIGS. 7 and 8 is formed on the inner side of the lip door 46 to accommodate the rearward edge 84 of the fairing 80, so that the inner surface of the fairing 80 and the central bottom surface of the lip door 46 meet to provide a substantially smooth, upper, central, inner nozzle wall in the cruise position. As can also be seen by reference to FIGS. 2 and 5, the inner side of the main door 44 contains a similar shoulder 90 meeting the rear edge 84 of the fairing 80 for a similar purpose.

Figure 12:
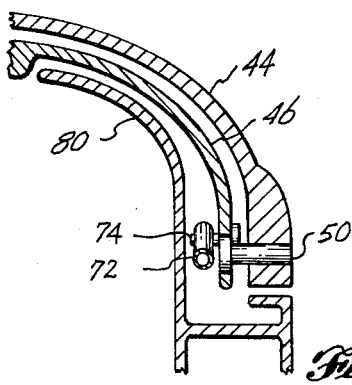
FIG. 12 is an enlarged sectional view of the region including and surrounding the right side pivot pin of the lip door as shown in FIG. 7.

Referring to FIGS. 5, 7, and 12, it will be seen that the lip door 46 is connected to the main door 44 by the pivot pins 50 which mount the lip door 46 for pivotal movement about an axis substantially parallel to the pivotal axis of the main door 44. Rigid links 72 are connected to the lower portion of the lip door 46 by pins 74 positioned forwardly of the pivot pins 50. A link 72 is located on both the right and left sides of the door 46. The links 72 extend rearwardly from their pivotal connection by pins 74 to a pivotal connection by pins 76 (as can be seen in FIG. 11) to the inner wall of the connecting member 42. The pivot pins 76 are located forwardly of the pivot pins 48 connecting the main door 44 to the connecting member 42. As can be seen when the doors 44 and 46 are in the cruise position, the links 72 reside in the space between the aft fairing 80 and the inner sides of the lip door 46 and the main door 44.

Figure 6:
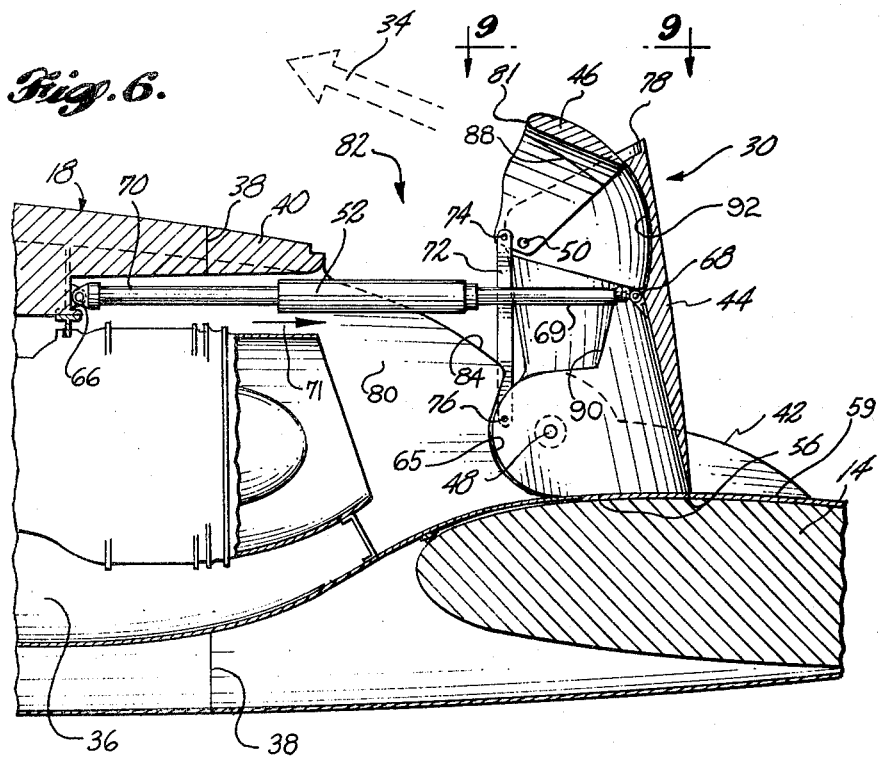
FIG. 6 is a longitudinal sectional view of the structure shown in FIG. 5 with the thrust reversing apparatus shown in the reversing position.

Referring to FIG. 5, the actuator 52 is connected at its forward end to a structural member on the engine 18 by a pin 66. The rearward end of the actuator 52 is connected by a pin 68 to a bracket extending downwardly from the upper central portion of the main door 44 rearwardly of the lip door 46. The actuator 52 is preferably of the quick-acting, hydraulic or pneumatic cylinder type. As shown in FIG. 5 the actuator 52 is in a retracted position. Referring to FIG. 6 the cylinder portion 70 of actuator 52 causes the piston rod 69 to longitudinally translate rearwardly from the cylinder portion 70 upon application of hydraulic or pneumatic fluid pressure thereto (by means not shown). As the piston rod 69 of the actuator 52 translates rearwardly in the direction of arrow 71, the main door 44 is pivoted in a rearward and upward direction about the pivot pins 48 to the reversing position as shown in FIG. 6. In the reversing position the rearward edge 56 of the main door 44 abuts against the upper surface of the panel 59 to prevent rearward escapement of exhaust gases from the engine 18. In this position the exhaust gases are diverted upwardly by the inner surface of door 44.

As the main door 44 is pivoted rearwardly and upwardly, rigid link 72 causes the lip door 46 to pivot forwardly about the pins 50 with respect to the main door 44 to the reversing position shown in FIG. 6. Thus a reversing nozzle opening, generally designated 82, is substantially formed by the forward edge 81 of the lip door 46 and the rearward edge 84 of the aft fairing 80 when the main door 44 and lip 46 are in the reversing position. In the reversing position, the lip door 46 serves to direct the exhaust gases at a lesser angle forwardly with respect to the longitudinal axis of the engine 18 and nozzle 30 than does the main door 44. This function of the lip door 46 is very important in that without it the exhaust stream from engine 18 would merely be directed substantially normally upwardly with respect to the longitudinal axis of the engine 18 and nozzle 30, and thus would not effectively provide a reverse thrust force.

Figure 9:
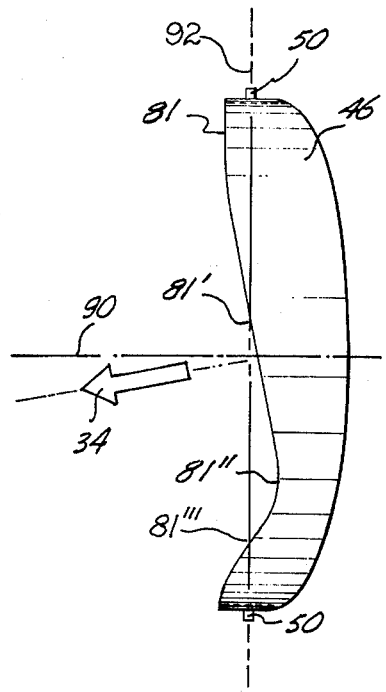
FIG. 9 is a view of the lip door employed with the reversing apparatus of the present invention viewed substantially in the direction of view line 9—9 of FIG. 6.

The lip door 46 serves another function best understood by reference to the view of FIG. 9. FIG. 9 is a view taken along the section line 9—9 of FIG. 6, with all structure except the lip door 46 removed for purposes of clarity. In FIG. 9 it can be seen that the forward edge 81 of the lip door 46 is positioned further rearwardly at a location near the longitudinal center line 90 than it is at a location near its right, inboard side. At a position intermediate the center line 90 and the outboard side of the door 46, the forward edge 81 is located further rearwardly than it is near the center line 90.

To better describe the curve formed by the forward edge 81 of the lip door 46 reference is made to a plane 92 positioned normally to the longitudinal axis 90 of the engine and intersecting the pivotal axis of the pivot pins 50. In the view of FIG. 9 the forward edge 81 is defined by a locus of points which reside forwardly of the plane 92 on the inboard side of the door 46, but gradually are positioned more closely to the plane 92 as the locus of points moves outboard toward the longitudinal center line 90. At a location 81' just short and inboard of the longitudinal center line 90, the locus of points intersects the plane 92. Therefore, after the locus of points gradually increase in distance rearwardly from plane 92, passing across the longitudinal center line 90 and continuing to increase in distance from the plane 92 as the locus of points move outwardly from the line 90. This distance continues to increase up to a point 81" when the locus of points begins to decrease in distance rearwardly from the plane 92 causing the locus of points to extend forwardly toward plane 92. At point 81''' the locus of points again intersects the plane 92 extending the edge 81 forwardly of plane 92 and increasing in distance from the plane 92 until the forward edge terminates at the lower forward corner of the lip door 46.

Still another way of explaining this curve is by the resulting effect on the exhaust stream issuing from under the lip door 46. The major portion of the inboard side of the forward edge 81 of the lip door 46 resides forwardly of the plane 92 and a major portion of the upper outboard side of the forward edge 81 adjacent center line 90 of the lip door 46 resides behind the plane 92. A region of low pressure outboard of the longitudinal center line 90 of the engine 18 is created as exhaust gases issue from under door 46 forwardly past the edge 81. Since there is a lower pressure outboard than inboard of line 90, the exhaust stream is pulled in an outboard direction and thus is diverted in the direction of arrow 34 away from the longitudinal center line 90 of the engine 18. So directing the exhaust stream outboard with respect to the engine and the aircraft will prevent impingement of hot exhaust gases on the aircraft.

It is to be understood that the detailed description above is for the left or port engine 18 and the related nozzle 30. It is to be understood that the reversing nozzle 30 of the starboard or right engine is substantially identical in configuration to that of the port engine 18, except for the configuration of lip door 46. The lip door 46 for the nozzle 30 of the starboard engine 18 is the mirror image of that shown in FIG. 9. By mirror image it is meant that the lip door 46 is asymetrical about the longitudinal center line 90 exactly oppositely to that shown in FIG. 9. Thus the reverse thrust from the starboard or right engine is directed forwardly and outwardly to the starboard from the fuselage 12 as shown by the arrow 34 extending from the starboard nozzle 30 in FIG. 1.

It should be noted that the motion of the lip door 46 is generally a rearward and upward displacement with only a slight increase in tilt angle with respect to the longitudinal axis of the engine as it moves from the cruise position to the reversing position. Thus as the main door 44 tilts aft and upwardly into a position fully obstructing the exhaust stream, the lip door 46 is displaced forwardly relative to the main door 44 into a flow directing reverse thrust position, where it can forwardly deflect the exhaust stream blocked by the main door 44 at an angle relative to the longitudinal axis of engine 18 much smaller than that which could be accomplished by the main door 44 alone.

Although the present invention has been described in relation to the preferred embodiment, it is to be understood that various changes, substitutions of equivalents, and other alterations can be made to the preferred embodiment by those of ordinary skill in the art without departing from the original concept of the invention. It is therefore intended that the present invention be limited only by the definition contained in the appended claims.

What is claimed is:

1. An improvement is thrust reversing apparatus for an aircraft including a main wing having an upper airfoil surface and a jet propulsion engine which develops thrust by discharge of an exhaust stream in a rearward direction from said engine, said engine having an exhaust nozzle for receiving said exhaust stream from said engine, said exhaust nozzle including a generally rounded and annularly shaped forward portion fixed to said engine, a lower wall fixed to and extending rearwardly from said forward portion and a pair of fixed sidewalls fixed to and extending rearwardly from said forward portion, said lower wall merging into said upper airfoil surface, said pair of sidewalls being spaced transversely relative to the discharge direction of said exhaust stream and being fixed to and extending upwardly from said lower wall, said improvement comprising:

a. movable door means having a channel-like configuration, said door means including a pair of sidewalls, a top wall, and a forward portion, said sidewalls being spaced transversely relative to the discharge direction of said exhaust stream and being spaced by a distance substantially equal to the spacing of the fixed sidewalls of said exhaust nozzle, said sidewalls having upper portions, said top wall extending between and interconnected with the upper portions of said sidewalls, said sidewalls and the top wall of said movable door means having forward edges and terminating in rearward edges, b. first means mounting said movable door means to the fixed sidewalls of said exhaust nozzle for movement between 1. a first position wherein the sidewalls of said movable door means extend upwardly from a location above respective ones of the fixed sidewalls of said nozzle and said top wall is spaced above said lower wall and wherein the top wall and the sidewalls of said movable door means extend rearwardly from the forward portion of said exhaust nozzle such that the sidewalls and the top wall of said movable door means cooperate with the lower wall and the fixed sidewalls of said exhaust nozzle to form a portion of said exhaust nozzle for directing said exhaust stream rearwardly and across the upper airfoil surface of said wing, and 2. a second position wherein said rearward edges of said movable door means abut said lower wall, wherein the sidewalls and the top wall of said movable door means extend upwardly from said lower wall to block the rearward discharge of said exhaust stream, and wherein said forward edges are located rearwardly and upwardly from the forward portion of said exhaust nozzle such that said forward edges, said fixed sidewalls and the forward portion of said exhaust nozzle form a reversing nozzle opening for directing said exhaust stream upwardly and forwardly relative to said engine, c. lip door means having an exhaust deflecting surface, d. second means mounting said lip door means on the forward portion of said movable door means for movement between 1. a nested position wherein said lip door means is nested between the sidewalls of said movable door means and below the top wall of said movable door means at a location rearward of and adjacent to the forward edges of said movable door means, and 2. a deflecting position wherein said exhaust deflecting surface is located such that, when said movable door means is in said second position, said exhaust stream will impinge upon said deflecting surface and will be deflected forwardly relative to the direction said exhaust stream is directed by said movable door means, and e. actuating means operatively coupled to said lip door means for moving said lip door means between said nested and said deflecting positions as said movable door means is moved respectively between said first and second positions.

2. The apparatus of claim 1 wherein said lip door means comprises a top wall and spaced sidewalls, said top wall having a forward edge and including said exhaust deflecting surface, said sidewalls connected to and extending downwardly from said top wall, said sidewalls being spaced at a distance less than the spacing of the sidewalls of said movable door means, said second means mounting the sidewalls of the lip door means to respective ones of the sidewalls of said movable door means, the forward edge and the exhaust deflecting surface of said lip door means being located forwardly and above the movable door means when said lip door means is in said deflecting position, and wherein said actuating means comprises a linkage means operatively connected between said lip door means and at least one of said fixed sidewalls of said nozzle.

3. The apparatus of claim 1 wherein said first means mounts the sidewalls of said movable door means to respective ones of said fixed sidewalls for fore and aft pivotal movement between said first and second positions.

4. The apparatus of claim 1 wherein the forward portion of said exhaust nozzle has an upper, rearward, central portion located above said lower wall, the improvement further comprising:

a fairing fixed to and extending rearwardly from said forward portion of said exhaust nozzle and underlying said movable door means when the latter is in said first position, said fairing including a rearward edge having mutually opposing portions, said mutually opposing portions of said rearward edge being curved downwardly and rearwardly in mutually opposing directions from a location adjacent the upper, rearward, central portion of the forward portion of said exhaust nozzle and merging into respective ones of said fixed sidewalls at a location forwardly of the rearward edges of the sidewalls of said movable door means when the latter is in said first position, said fairing cooperating with said movable door means when the latter is in said second position to form a reversing nozzle opening to direct said exhaust stream upwardly and forwardly.

5. The apparatus of claim 1 wherein said lip door means has a reference line extending rearwardly along the central portion of the top wall thereof and wherein said exhaust deflecting surface of said lip door means has a forward edge defined by a first locus of points on one side of said reference line which lies along a path substantially forwardly of a vertical reference plane oriented transversely to said reference line and a second locus of points on the other side of said reference line which lies along said exhaust nozzle, when said movable door means is in said first position, to form an exhaust nozzle opening positioned above said upper airfoil surface.

6. The apparatus of claim 5 wherein said forward edge is further defined by a third locus of points on said other side of said reference line, said third locus of points being spaced transversely outwardly from said reference line and said second locus of points, said third locus of points lying forwardly of said reference plane, said second and third locus of points joining to form a smooth path intersecting said reference plane.

7. The apparatus of claim 1 wherein the rearward edges of the sidewalls and the top wall of said movable door means cooperate with the lower wall and the fixed sidewalls of said exhaust nozzle, when said movable door means is in said first position, to form an exhaust nozzle opening positioned above said upper airfoil surface.

* * * * *